US009648191B2

United States Patent
Ito (10) Patent No.: US 9,648,191 B2
(45) Date of Patent: May 9, 2017

(54) JOB PROCESSING APPARATUS, METHOD FOR CONTROLLING JOB PROCESSING APPARATUS, AND STORAGE MEDIUM

(71) Applicant: CANON KABUSHIKI KAISHA, Tokyo (JP)

(72) Inventor: Koichi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/813,746

(22) Filed: Jul. 30, 2015

(65) Prior Publication Data

US 2016/0037009 A1 Feb. 4, 2016

(30) Foreign Application Priority Data

Aug. 4, 2014 (JP) .................. 2014-158416

(51) Int. Cl.
*H04N 1/00* (2006.01)
(52) U.S. Cl.
CPC ..... *H04N 1/00923* (2013.01); *H04N 1/00403* (2013.01); *H04N 1/00917* (2013.01); *H04N 1/00925* (2013.01)
(58) Field of Classification Search
USPC ....................................................... 358/1.14
See application file for complete search history.

(56) References Cited

U.S. PATENT DOCUMENTS

| 8,467,074 B2* | 6/2013 | Hirose | ................... G06K 15/02 270/52.01 |
| 2008/0115222 A1* | 5/2008 | Ahmed | ................. G06F 21/608 726/26 |
| 2008/0144077 A1* | 6/2008 | Ahmed | ................ G09B 21/001 358/1.15 |

FOREIGN PATENT DOCUMENTS

JP 2006-094127 A 4/2006

OTHER PUBLICATIONS

Ryoji, Notification Method Interruption Inhibition Method Interruption Control Method Job Processor and User Terminal, Jun. 4, 2006, Manchine Translation Japanese Patent Application Publication, JP2006094127, All Pages.*

* cited by examiner

*Primary Examiner* — Ngon Nguyen
(74) *Attorney, Agent, or Firm* — Canon U.S.A., Inc. IP Division (57) ABSTRACT

A method for controlling a job processing apparatus includes determining, when an instruction is issued to input a job by a voice that is input via a voice receiving unit, whether there is another job being executed. If the determining determines that the other job is being executed, an inquiry is made of a user about whether to interrupt the other job to execute the input job or to execute the input job without interrupting the other job.

9 Claims, 8 Drawing Sheets

JOB PROCESSING APPARATUS, METHOD FOR CONTROLLING JOB PROCESSING APPARATUS, AND STORAGE MEDIUM

BACKGROUND OF THE INVENTION

Field of the Invention

The present disclosure generally relates to processing and, more particularly, to a job processing apparatus, a method for controlling the job processing apparatus, and a storage medium.

Description of the Related Art

Conventionally, a multifunction peripheral (MFP) used as a printing apparatus is equipped with a mode for visually impaired users that allows the users to check the status of the MFP and also input a job via voice recognition. In particular, a technique is known in which, when another user interrupts a job input by a visually impaired user, the user is asked by voice or the like whether to permit the interruption (refer to Japanese Patent Application Laid-Open No. 2006-94127).

However, with the above-described technique, if a visually impaired user makes a copy without interrupting a job of another user that is being printed, the user is unable to recognize at which timing the copy made by the user is to be output. In addition, there is a problem that a printout for the user is mixed into printouts of others and the user has difficulty finding his or her printout.

SUMMARY OF THE INVENTION

According to an aspect of the present disclosure, a job processing apparatus includes a voice receiving unit configured to receive an input voice, a first determination unit configured to determine, when an instruction is issued to input a job by the input voice received by the voice receiving unit, whether there is another job being executed, and an inquiry unit configured to make an inquiry, when the determination unit determines that the other job is being executed, of a user about whether to interrupt the other job to execute the input job or to execute the input job without interrupting the other job.

Further features of the present disclosure will become apparent from the following description of exemplary embodiments with reference to the attached drawings.

DESCRIPTION OF THE EMBODIMENTS

Hereinafter, exemplary embodiments of the present disclosure will be described with reference to the drawings.

<Description of System Configuration>
<Configuration of MFP>

Figure 1:
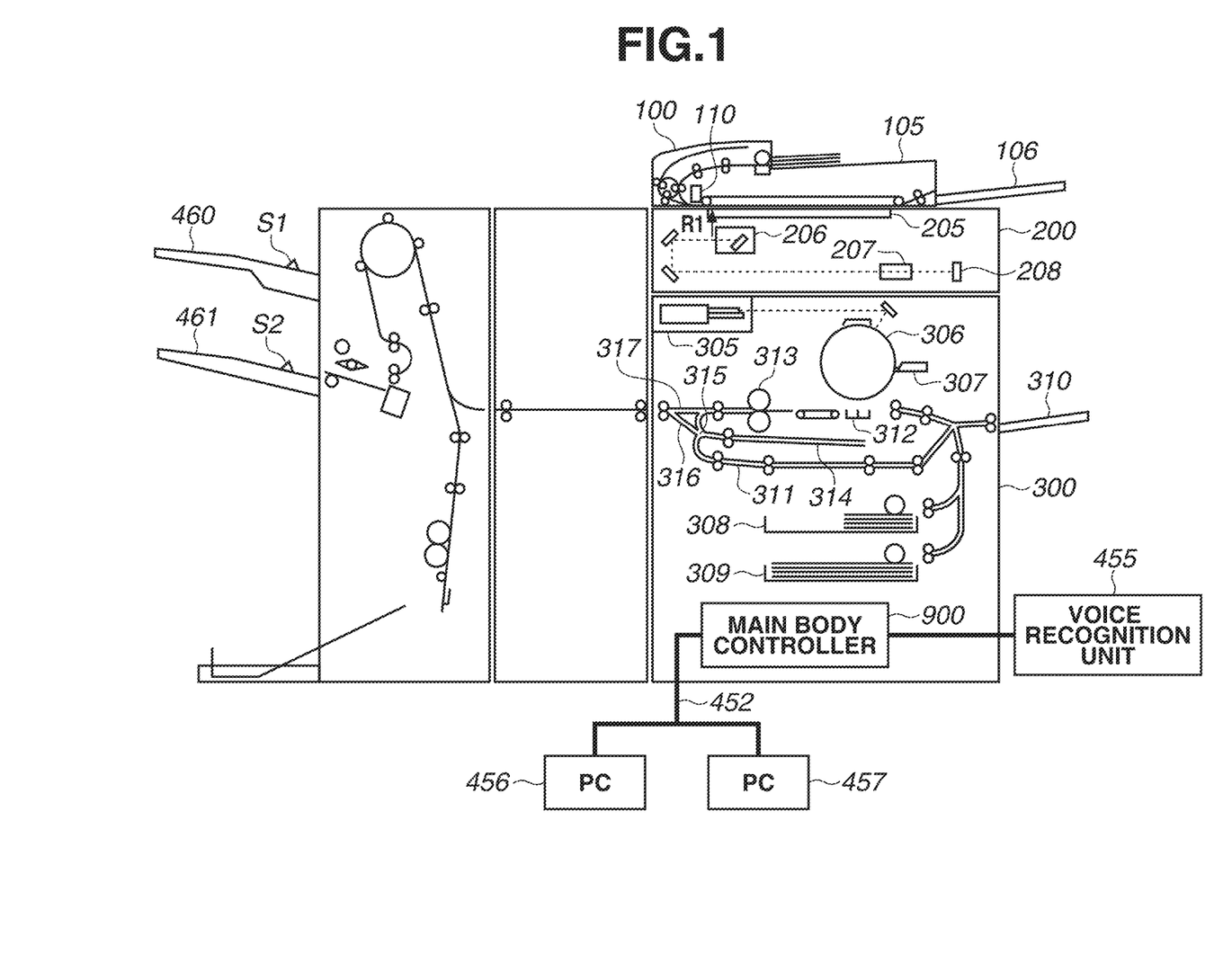
FIG. 1 illustrates a configuration of a printing apparatus.

FIG. 1 illustrates a configuration of a printing apparatus according to a first exemplary embodiment of the present disclosure. An MFP including an image reader 200 and a printer unit 300 is taken as an example of the printing apparatus according to the present exemplary embodiment. A document conveyance device 100 is mounted on an upper portion of the image reader 200. The printing apparatus according to the present exemplary embodiment includes two discharge trays 460 and 461. The discharge trays 460 and 461 are provided with sensors S1 and S2, respectively. The sensors S1 and S2 are disposed at predetermined positions to detect the presence of discharged sheets. Outputs of the sensors S1 and S2 are transmitted to a controller control unit 400 to be described below. As used herein, the term "unit" generally refers to any combination of software, firmware, hardware, or other component, such as circuitry, that is used to effectuate a purpose.

With reference to FIG. 1, the document conveyance device 100 feeds documents placed on a document tray 105 one by one from the first page, and conveys the documents onto a platen glass 205 through a curved path. A method for reading a one-sided document includes a fixed document reading mode and a moving document reading mode. In the fixed document reading mode, the trailing end of the document is conveyed to a reading position R1 on the platen glass 205 and is stopped. Then, a scanner unit 206 is moved from left to right so as to read the document. In the moving document reading mode, the document is conveyed to the reading position R1 at a certain reading speed, and then the document is read by the scanner unit 206 that is fixed at the reading position R1. Thereafter, in either mode, the read document is discharged to a discharge tray 106.

In a method for reading a two-sided document, the front side of the document is read by the scanner unit 206, and the back side is read by using an optical unit 110 disposed inside the document conveyance device 100. A detailed description will be given below. An image sensor, a light source, and so on (not illustrated) are disposed in the optical unit 110.

Figure 2:
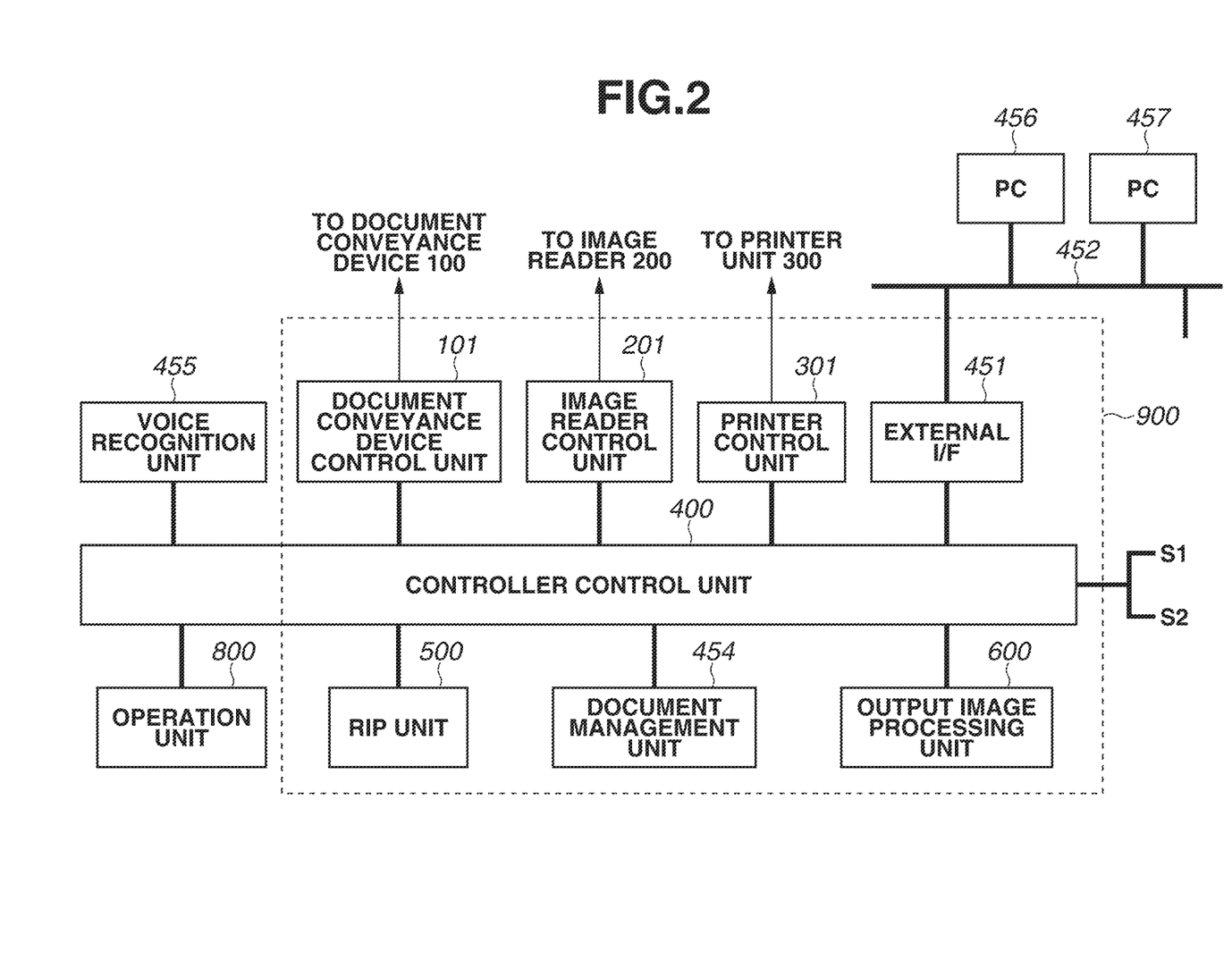
FIG. 2 is a block diagram illustrating an overall configuration of a control unit of the printing apparatus.

An image of the document read by an image sensor 208 through a lens 207 is subjected to image processing, and the resulting image is stored in a hard disk and is also transmitted to an exposure control unit 305 via a printer control unit 301 (see FIG. 2). The exposure control unit 305 outputs a laser beam according to an image signal. When a photosensitive drum 306 is irradiated with this laser beam, an electrostatic latent image is formed on the photosensitive drum 306. The electrostatic latent image on the photosensitive drum 306 is developed by a developing unit 307, and a developer on the photosensitive drum 306 is transferred, by a transfer unit 312, onto a sheet fed from any one of cassettes 308 and 309, a manual feed unit 310, and a two-sided conveyance path 311.

The sheet on which the developer has been transferred is guided to a fixing unit 313, and fixing processing of the developer is performed therein. The sheet that has passed through the fixing unit 313 is once guided to a path 314 via a path 315 by a flapper (not illustrated). After the trailing end of the sheet has passed through the path 315, the sheet is switched back and is guided to a discharge roller 317 via a path 316. Thus, the sheet can be discharged from the printer unit 300 by the discharge roller 317 while the side of the sheet on which the developer has been transferred is facing downward (in a face-down state). This is referred to as a reverse discharge. Discharging the sheet in the face-down state in this manner allows, for example, when images obtained by reading a plurality of documents by the document conveyance device 100 are to be printed, image formation to be performed in the correct page order starting from the first page.

In a case where an image is formed on a stiff sheet, such as an overhead projector (OHP) sheet, which is fed from the manual feed unit 310, the sheet is discharged through the discharge roller 317 without being guided to the path 315 while the side of the sheet on which the developer has been transferred is facing upward (in a face-up state).

In addition, in a case where an image is formed on both sides of a sheet, the sheet is guided to the path 315 and the path 314 from the fixing unit 313, and immediately after the trailing end of the sheet has passed through the path 315, the sheet is switched back and is guided to the two-sided conveyance path 311 by a flapper (not illustrated). Onto the sheet guided to the two-sided conveyance path 311, an electrostatic latent image is again transferred by the transfer unit 312, and the sheet is subjected to the fixing processing by the fixing unit 313.

The path length, the roller arrangement, and division of driving systems are determined so that, up to five half-sized sheets of A4 and B5 sizes and so on can be conveyed in the above-described cyclic path from the transfer unit 312 to the transfer unit 312 via the two-sided conveyance path 311. With respect to the page order of sheets discharged in the aforementioned processing, the sheets are discharged so that odd pages face downward, and thus the correct page order in two-sided copying can be achieved.

FIG. 2 is a block diagram illustrating an overall configuration of a main body controller (control unit) 900 of the printing apparatus illustrated in FIG. 1. Hereinafter, the controller control unit 400 that controls the entire printing apparatus will be described.

With reference to FIG. 2, a document conveyance device control unit 101 controls the document conveyance device 100. An image reader control unit 201 controls the image reader 200. The controller control unit 400 communicates with the document conveyance device control unit 101 and the image reader control unit 201 based on settings made on an operation unit 800 or instructions from external computers 456 and 457, and acquires image data of an input document.

In addition, the controller control unit 400 communicates with the printer control unit 301, which controls the printer unit 300, and prints the image data on a sheet. In a case where a page description language (PDL) job is input from the external computer 456 or 457, the PDL job is subjected to raster image processing (RIP) by a RIP unit 500. The image data that has been rasterized by the RIP unit 500 is stored in a document management unit 454. Furthermore, an image to be printed is subjected to image processing as necessary by an output image processing unit 600 for printing the image.

A voice recognition unit 455 outputs a voice through a speaker to inform a user of the status of the MFP. The voice recognition unit 455 also recognizes a user's voice to determine the job input by the user and provides the information to the controller control unit 400. A detailed description will be given below.

An external interface (I/F) 451 is an interface for connecting the external computers 456 and 457 to the MFP. For example, the external I/F 451 connects to the external computers 456 and 457, which are examples of an information processing apparatus, via an external bus 452 such as a network and a Universal Serial Bus (USB), rasterizes print data from the external computers 456 and 457 into images, and outputs the images.

Figure 3:
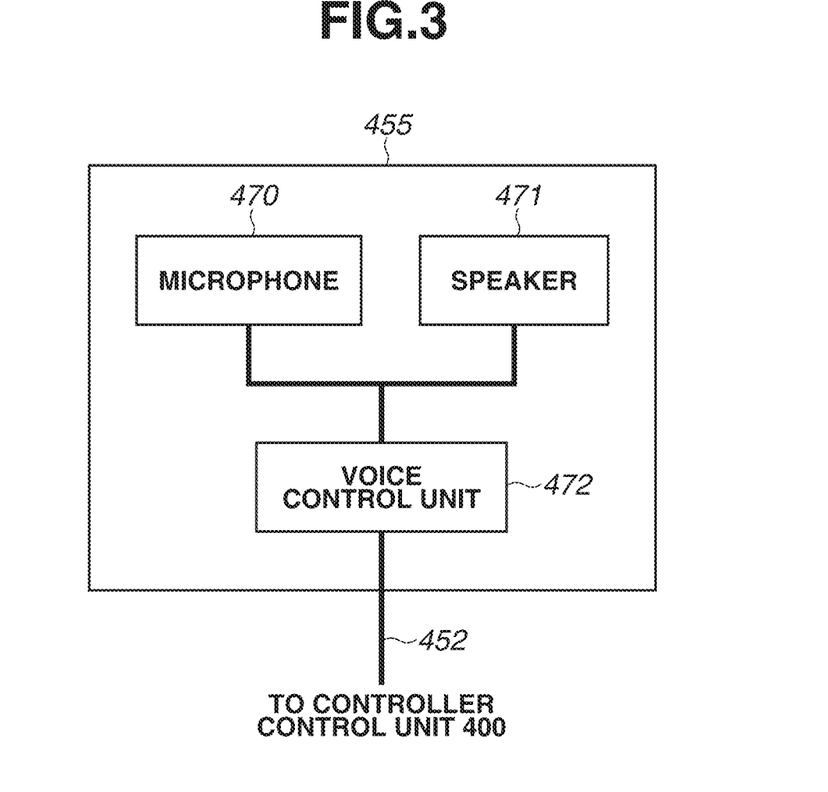
FIG. 3 is a block diagram illustrating a configuration of a voice recognition unit.

FIG. 3 is a block diagram illustrating a configuration of the voice recognition unit 455 illustrated in FIG. 1.

With reference to FIG. 3, a voice control unit 472 outputs, to a speaker 471, the status of the MFP based on the information from the controller control unit 400 or a question to the user. In addition, the voice control unit 472 picks up a user's voice with a microphone 470 and analyzes the voice. The voice control unit 472 thus determines the content of the input information and provides the information to the controller control unit 400 so as to cause the MFP to perform the desired operation.

<Flow of Job Input via Voice Recognition of Printing Apparatus>

Figure 4:
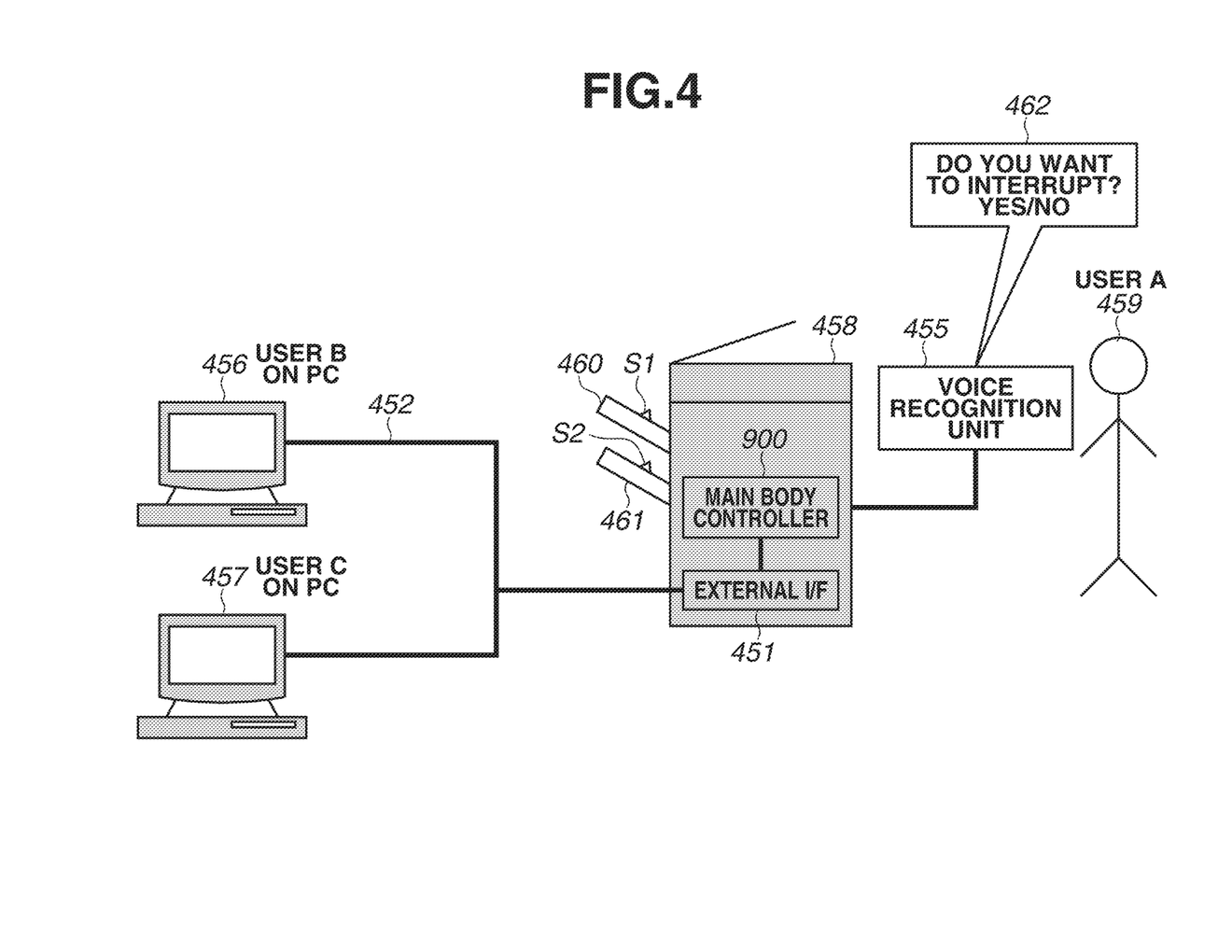
FIG. 4 illustrates job processing performed by the printing apparatus.

FIG. 4 illustrates job processing performed by the printing apparatus according to the present exemplary embodiment. Hereinafter, a flow of a job input via voice recognition will be described.

With reference to FIG. 4, an MFP 458 receives a job (PDL data) from the external computer 456 of a user B via the external I/F 451 and starts printing the job. For example, it is assumed here that, while the MFP 458 is printing the job received from the external computer 456 of the user B, a user 459 corresponding to a user A who is visually impaired inputs a job, such as a copy job, to the MFP 458.

In this case, the controller control unit 400 first determines whether the job has been input via the voice recognition unit 455. For example, the user 459, who is visually impaired, says "voice recognition mode" to the microphone 470 of the MFP 458, and thus the MFP 458 enters a voice recognition mode.

Thereafter, the MFP 458 outputs, via the speaker 471, guidance, such as "Please place a document." or "Please say 'print execution' after the copy setting is completed." Then, when the user 459 says "print execution" to the microphone 470, a job is input to the MFP 458. With respect to print settings, the MFP 458 can also be configured to recognize utterances regarding the number of copies, an image layout, and so on with the voice recognition unit 455 and perform the print settings so as to correspond to the utterances.

When a job has been input by using the voice recognition unit 455 in this manner, the controller control unit 400 determines whether there is a job being executed. If there is a job being executed, the controller control unit 400 inquires, by using voice guidance 462 via the speaker 471, of the user 459 corresponding to the user A about whether to interrupt the job being executed. Then, the user 459 responds by inputting a voice to the microphone 470.

In the meantime, if it is determined that there is no job currently being executed in the MFP 458, the input job is directly executed. In addition, when the job is input without using the voice recognition unit 455, control is performed so that, if there is a job being executed, the input job is executed after the job being executed is finished, and if there is no job being executed, the input job is directly executed.

Figure 5:
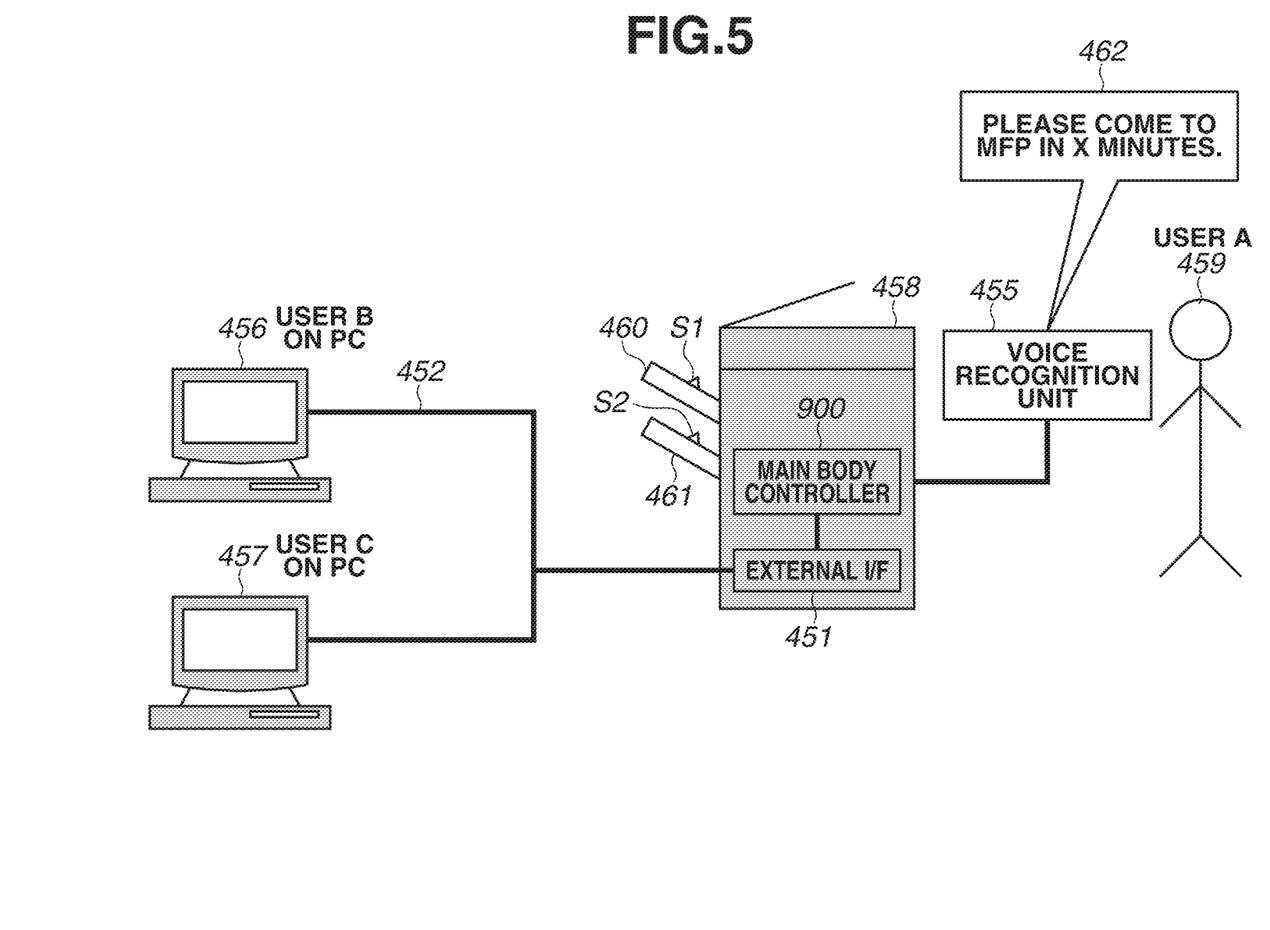
FIG. 5 illustrates the job processing performed by the printing apparatus.

FIG. 5 illustrates the job processing performed by the printing apparatus according to the present exemplary embodiment. This example corresponds to an example of job processing performed when a job being executed is not to be interrupted.

When the job being executed is not to be interrupted, the time to finish the job being executed is calculated by the controller control unit 400, and the voice recognition unit 455 notifies the user A 459, via the speaker 471, as to in how many minutes the user A 459 should come to collect a printout (with the voice guidance 462). Alternatively, when the job being executed is to be interrupted, it is temporarily stopped, and the input job is then executed.

Figure 6A:
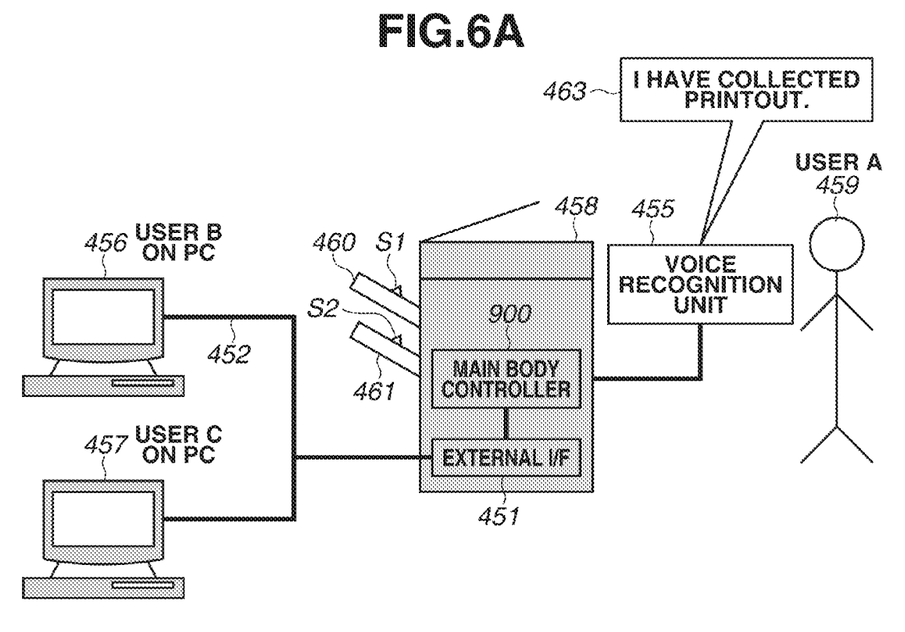
FIGS. 6A and 6B illustrate the state of a bundle of sheets stacked on a discharge tray.
Figure 6B:
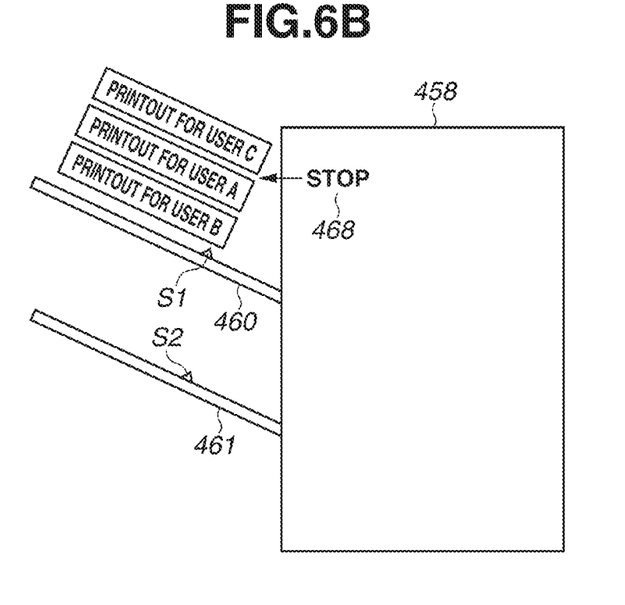

FIGS. 6A and 6B illustrate the state of a bundle of sheets stacked on the discharge tray 460 of the printing apparatus according to the present exemplary embodiment.

It is assumed in FIG. 6A that after the user A inputs a job via the external computer 456, a user C inputs another job via the external computer 457. In this case, after printing of the job of the user A has been finished to produce a printout, printing of a job 468 of the user C is suspended until the user A collects the printout, as illustrated in FIG. 6B, and the printout for the user A is caused to be placed on top of the stack. Since the printout for the user A is placed on top, the user A can collect a desired number of sheets from the top of the stack on the discharge tray 460, which makes it easier for the user A to search for the printout. In addition, after collecting the printout, the user A speaks to the microphone 470 so as to input to the voice recognition unit 455 a message 463 indicating that the user A has collected the printout. In response to the message 463 being generated, the controller control unit 400 controls the MFP 458 to execute the job 468 of the user C that has been suspended.

<Flow of Processing on Job Input Via Voice Recognition>

Figure 7:
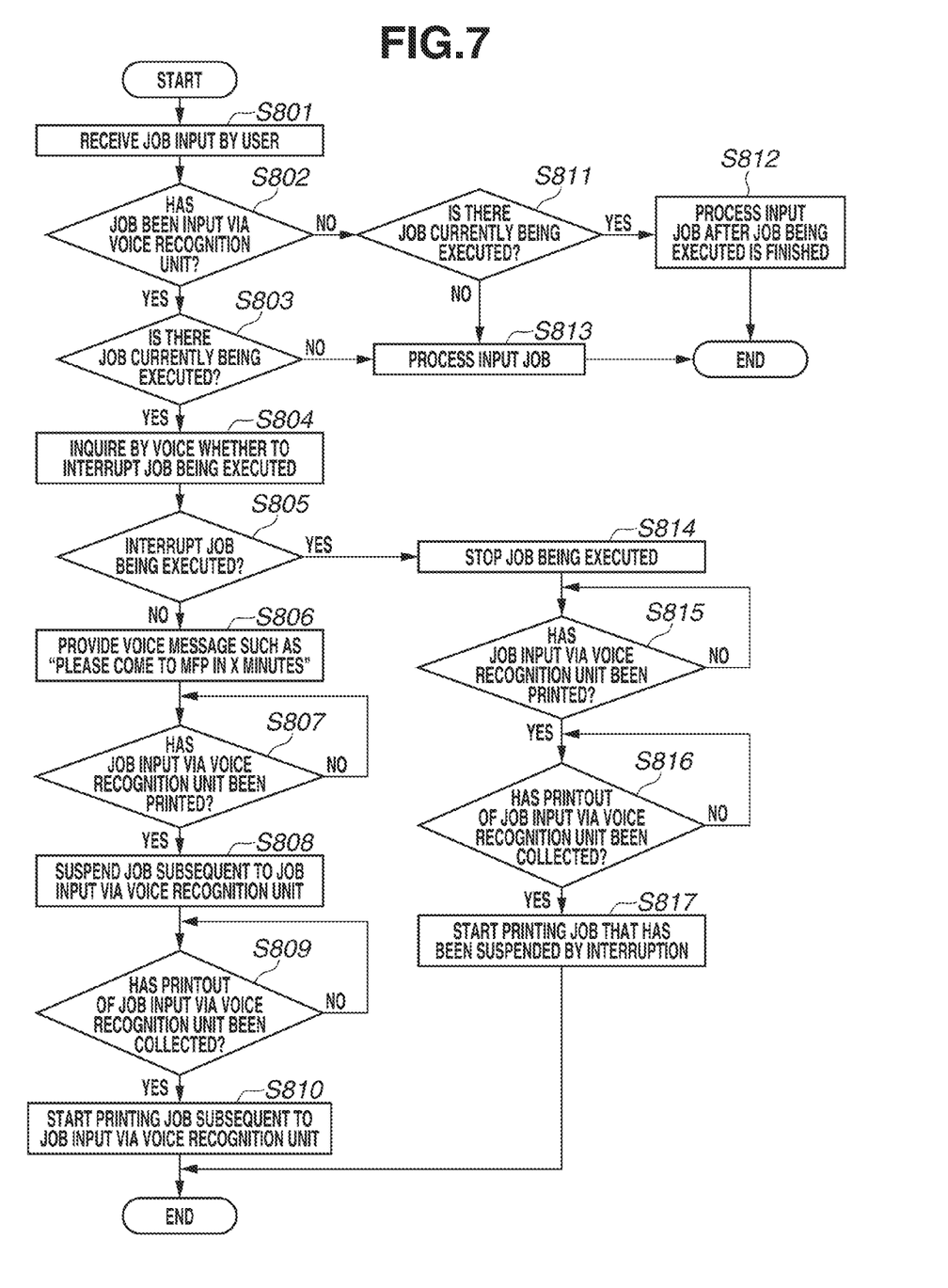
FIG. 7 is a flowchart illustrating a method for controlling the printing apparatus.

FIG. 7 is a flowchart illustrating a method for controlling the printing apparatus according to the present exemplary embodiment. This example corresponds to an example of job processing performed when a job is input via voice recognition. Each of the steps is implemented by a central processing unit (CPU) included in the controller control unit 400, which executes a control program stored in a read-only memory (ROM) or the like.

In step S801, a user inputs a job to the printing apparatus, and in step S802, the controller control unit 400 determines the job has been input via voice recognition. If the controller control unit 400 determines that the job has not been input via voice recognition (NO in step S802), then in step S811, the controller control unit 400 determines whether there is a job currently being executed in the printing apparatus. If the controller control unit 400 determines that there is a job being executed (YES in step S811), then in step S812, the controller control unit 400 processes the input job after the job being executed has been finished.

Meanwhile, if the controller control unit 400 determines that there is no job currently being executed (NO in step S811), then in step S813, the controller control unit 400 processes the input job.

In the meantime, if the controller control unit 400 determines that the job has been input via voice recognition (YES in step S802), then in step S803, the controller control unit 400 determines whether there is a job currently being executed. If the controller control unit 400 determines that there is no job being executed (NO in step S803), then in step S813, the controller control unit 400 processes the input job.

If there is a job being executed (YES in step S803), then in step S804, the controller control unit 400 inquires by voice whether to interrupt the job being executed. In step S805, if the controller control unit 400 receives a voice response indicating that the job being executed is not to be interrupted (NO in step S805), then in step S806, the controller control unit 400 provides a voice message such as "please come to the MFP in X minutes."

In step S807, if the controller control unit 400 determines that printing of the job input via voice recognition has been finished (YES in step S807), then in step S808, the controller control unit 400 suspends processing of a job subsequent to the input job. Next in step S809, the controller control unit 400 determines whether a printout of the job input via voice recognition has been collected. If the controller control unit 400 determines that the printout has been collected (YES in step S809), then in step S810, the controller control unit 400 starts printing the job subsequent to the job input via voice recognition.

Meanwhile, if the controller control unit 400 determines in step S805 that a voice response indicating that the job being executed is to be interrupted has been received (YES in step S805), then in step S814, the controller control unit 400 suspends the processing of the job being executed. Then, in step S815, the controller control unit 400 determines whether printing of the job input via voice recognition has been finished. If the controller control unit 400 determines that the printing of the job input via voice recognition has been finished (YES in step S815), then in step S816, the controller control unit 400 determines whether the printout of the job input via voice recognition has been collected. If the controller control unit 400 determines that the printout has been collected (YES in step S816), then in step S817, the controller control unit 400 starts printing the job that has been suspended due to the interruption.

Thus, in a case where a job to be executed is received from a user who uses a voice input, even if there is another job currently being executed, the job being executed can be suspended properly, and the received job can be processed by an interruption.

In the above-described exemplary embodiment, the case has been described in which the determination as to whether the user is visually impaired is made based on whether the printing apparatus is in a mode where the voice recognition unit 455 is used. However, an example of determining whether the user is visually impaired is not limited thereto. For example, the determination may be made based on whether the printing apparatus is in a voice guidance mode where the user operates the numeric keypad on the operation unit 800 to move a focus on a display unit.

In the first exemplary embodiment described above, after the printing of the job of the user B has been finished to produce a printout, no operation is requested regarding the printout, and the job of the user A is immediately printed. However, in a second exemplary embodiment, an example will be described where, after the user A moves the printout for the user B to another tray, printing of the job of the user A is started.

Figure 8A:
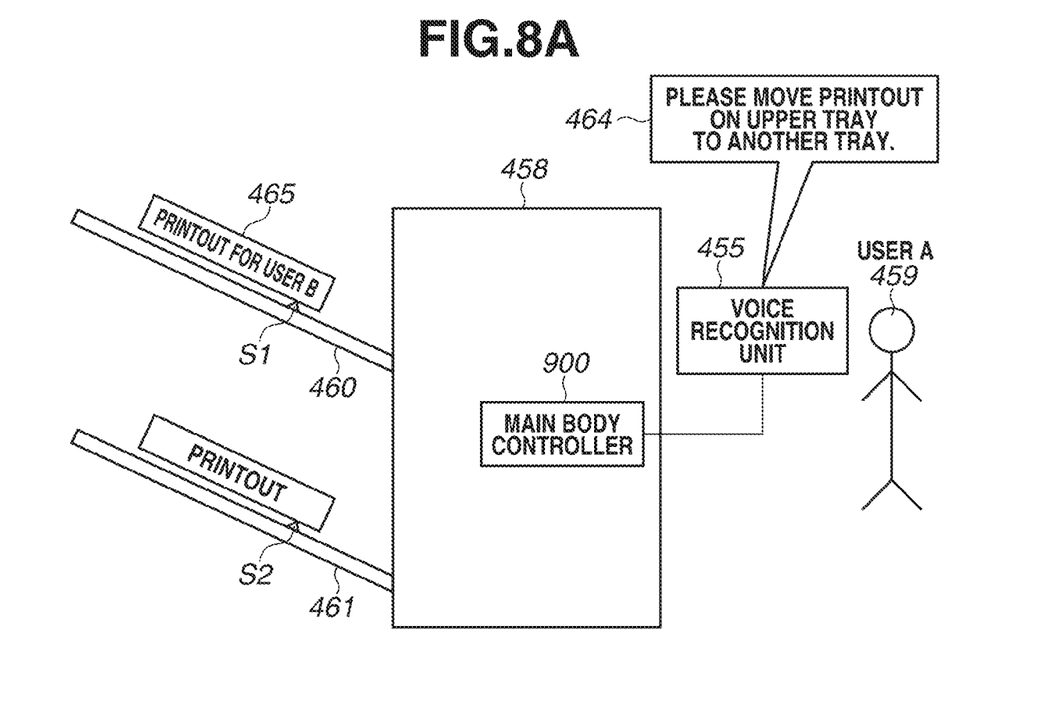
FIGS. 8A and 8B illustrate a job processing state in the printing apparatus.
Figure 8B:
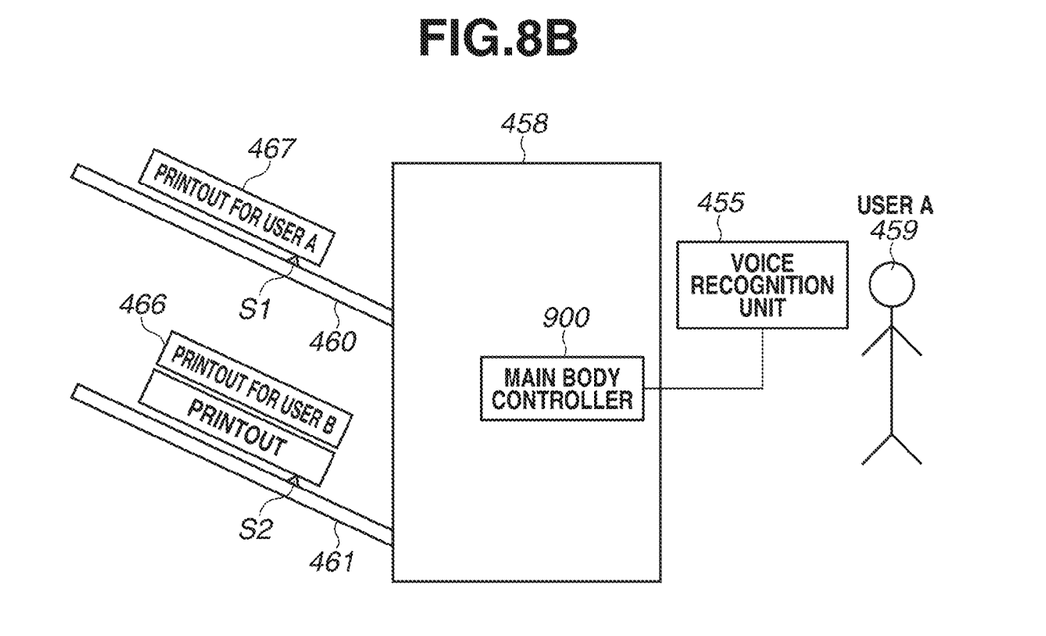

FIGS. 8A and 8B illustrate a job processing state in a printing apparatus according to the present exemplary embodiment. FIG. 8A illustrates the state where the printout for the user B has not been moved prior to printing the job of the user A.

With reference to FIG. 8A, in a case where printouts are stacked on both the discharge trays 460 and 461 of the MFP 458, the voice recognition unit 455 provides a user with a voice message 464 indicating that a printout 465 on the upper discharge tray 460 needs to be moved to the other discharge tray 461. When the user A moves the printout 465 placed on the upper discharge tray 460 to the lower discharge tray 461 as a printout 466 (illustrated in FIG. 8B), the user A notifies the voice recognition unit 455 that the printout 465 has been moved, so that printing of the job of the user A is started to produce a printout 467. In this manner, only the printout for the user A is present on the upper discharge tray 460, and the user A, who is visually impaired, only needs to collect the entire printout on the discharge tray 460 without counting the number of sheets, which thereby improves the usability.

In the case of a printing apparatus including two or more discharge trays, if it is determined that there is an empty discharge tray (not illustrated), the job of the user A may be printed and discharged to the empty discharge tray. The configuration is such that whether there is a printout discharged to the discharge trays 460 and 461 is detected by the sensors S1 and S2, respectively and the controller control unit 400 can check such a status.

In the first exemplary embodiment described above, printing of the job of the user C is suspended until the user A collects the printout. Alternatively, printing of the job of the user C may be resumed if the user A has not collected the printout even after the elapse of a predetermined time period. In the aforementioned process in which the suspended job is printed if the printout has not been collected even after the elapse of a predetermined time period, the predetermined time period may be varied.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-158416, filed Aug. 4, 2014, which is hereby incorporated by reference herein in its entirety.

What is claimed is:

1. A printer comprising a controller configured to function as:
   a receiving unit configured to receive a voice instruction based on a user's voice;
   a determination unit configured to determine that there is a print job being in execution; and
   an execution unit configured to interrupt the print job determined to be in execution to execute another print job corresponding to a received voice instruction, according to the received voice instruction.

2. The printer according to claim 1, wherein the user's voice indicates that the another print job is executed by interrupting a print job being in execution.

3. The printer according to claim 1, wherein the execution unit is configured to execute a rest of the interrupted print job after the execution of the another print job has been completed.

4. The printer according to claim 3,
   wherein a printout of the another print job is to be discharged to a tray, and
   wherein the receiving unit is further configured to receive another voice instruction based on another user's voice which indicates that the printout has been removed from the tray, and the executing unit executes the rest of the interrupted print job according to the received another voice instruction.

5. The printer according to claim 1,
   wherein the controller is further configured to function as an inquiring unit configured to make an inquiry to the user about whether to interrupt the print job determined to be in execution to execute the another print job, by voice guidance, and
   wherein the receiving unit is configured to receive the voice instruction as a response to the inquiry, and the execution unit is configured to interrupt, according to the received voice instruction, the print job determined to be in execution and to execute the another print job.

6. The printer according to claim 5, further comprising a microphone and a speaker,
   wherein the microphone is configured to capture the user's voice and convert the user's voice into voice data corresponding to the voice instruction, and
   wherein the speaker is configured to convert a content of the inquiry into the voice guidance.

7. The printer according to claim 1, wherein the print job is a PDL (page description language) job and the another print job is a copy job.

8. A printing method implemented by a printer, the printing method comprising:
   receiving a voice instruction based on a user's voice;
   determining that there is a print job being in execution; and
   interrupting the print job determined to be in execution to execute another print job corresponding to the received voice instruction, according to the received voice instruction.

9. A non-transitory computer readable medium storing a program which causes a computer to execute a method, the method comprising:
   receiving a voice instruction based on a user's voice;
   determining that there is a print job being in execution; and
   interrupting the print job determined to be in execution to execute another print job corresponding to the received voice instruction, according to the received voice instruction.

* * * * *